Aug. 21, 1945.  G. ABEL  2,383,103

ELECTRIC POWER TRANSMITTER

Filed March 9, 1943  2 Sheets-Sheet 2

Inventor
George Abel
By
John F. Heine
Attorney

Witness:
Godfrey Pecina

Patented Aug. 21, 1945

2,383,103

UNITED STATES PATENT OFFICE 2,383,103

ELECTRIC POWER TRANSMITTER

George Abel, Plainfield, N. J., assignor to The Singer Manufacturing Company, Elizabeth, N. J., a corporation of New Jersey Application March 9, 1943, Serial No. 478,531

8 Claims. (Cl. 192—18)

This invention relates to electric power-transmitters of the type used as individual drives for small machines which require a quick acceleration and deceleration such, for instance, as the manufacturing types of sewing machines.

One of the objects of this invention is to construct a power-transmitter having an improved form of mechanism for shifting the driven element into and out of engagement with the driving element and to use the shifting means as an additional support for the driven element.

Another object of the invention is to construct a power-transmitter which is compact, economical to manufacture, and which may be readily assembled or disassembled for the purpose of repair or for replacing the friction element between the driving and driven element.

With the above and other objects in view, as will hereinafter appear, the invention comprises the devices, combinations, and arrangements of parts hereinafter set forth and illustrated in the accompanying drawings of a preferred embodiment of the invention, from which the several features of the invention and the advantages attained thereby will be readily understood by those skilled in the art.

Figure 1:
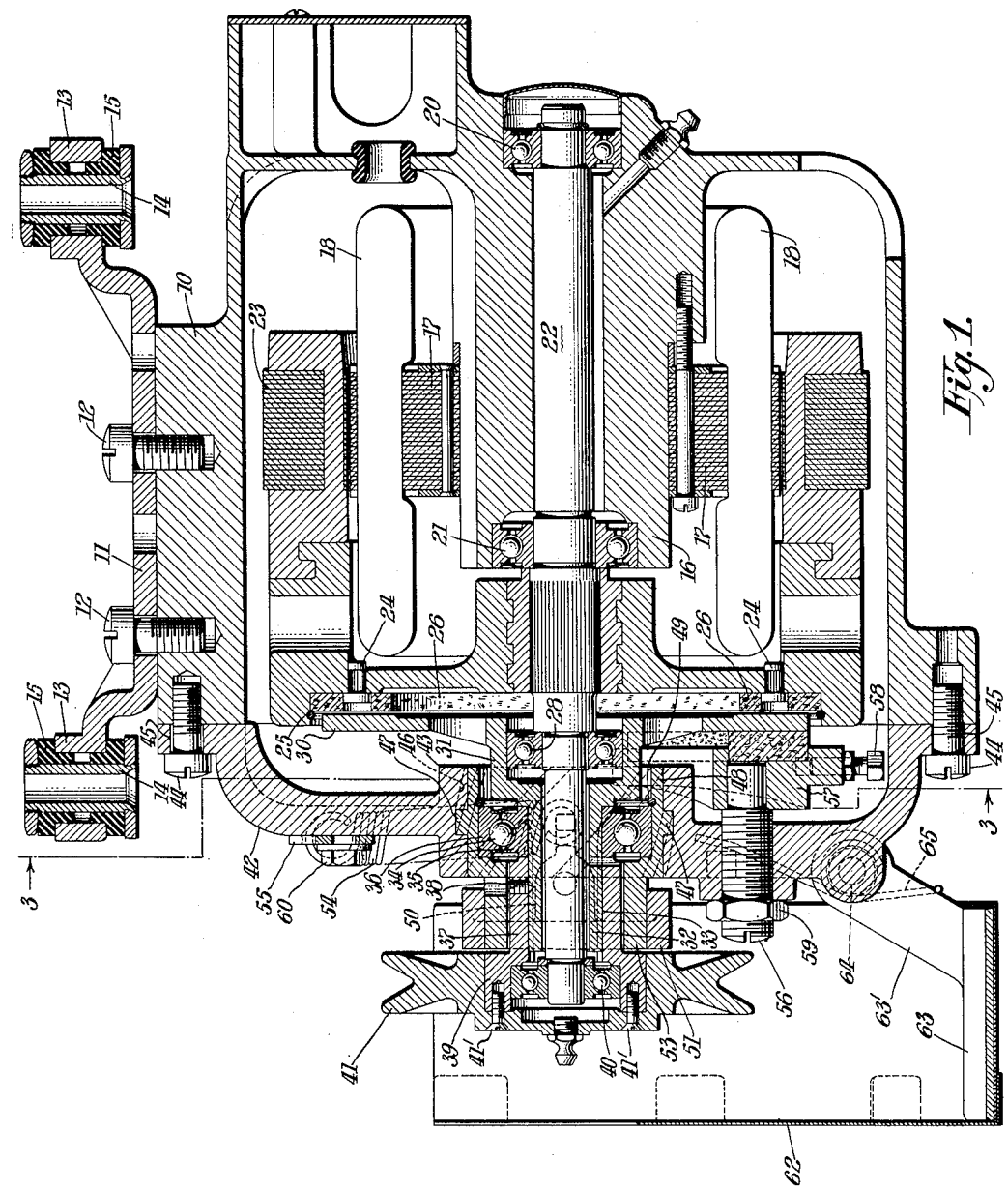
Figure 1 is a vertical section taken through my improved transmitter.

In the embodiment of the invention selected for illustration my improved power-transmitter comprises a hollow cylindrical frame or casing 10 secured to a hanger 11 by the screws 12. The hanger 11 is formed with feet 13 which are adapted to be secured to the under side of a sewing machine table by bolts or screws which extend through the sleeves 14 of the vibration and sound absorbing mounting 15.

The frame 10 houses an electric motor, clutch and brake mechanism and is formed with an inwardly extending central tubular portion 16. Fixed to the external periphery of the portion 16 is an electric motor stator 17 carrying a winding 18 of any desired type. Also carried by the tubular portion 16 are the ball bearings 20, 21 in which is journalled a motor shaft 22 having fixed thereto a rotor 23 of the external type and which cooperates with the stator 17. The above described electric motor is old and well known and is fully disclosed in the patent to Naul, No. 1,663,607, dated March 27, 1928.

Secured to the rotor 23 by the pins 24 and the split spring-ring 25 is a disk of friction material 26. The external rotor 23 of the electric motor is thus provided with a driving clutch face and it will be understood that the rotor acts as a flywheel and constitutes the driving element of a clutch. Carried by the shaft 22 is a ball bearing 28, on the outer race of which is journalled one end of the driven element of a clutch. The driven element comprises, a disk 30 having a hub portion 31 formed with a centrally located tubular portion 32 provided with splines 33 on its outer periphery. The tubular portion 32 of the driven element passes through a ball bearing 34 having an inner race 35 and an outer race 36 and surrounding the tubular portion 32 is a sleeve 37 having internal splines which are complemental to the splines on the portion 32 and mate therewith. The end of the sleeve 37 engages one side of the inner race 35 of the ball bearing 34 and the sleeve is locked in position by a set-screw 38. In this manner the inner race 35 of the ball bearing 34 is held against endwise movement between the driven element of the clutch and the sleeve 37. An enlargement portion 39 is formed on the sleeve 37 and the inner periphery of the enlargement engages the outer periphery of a ball bearing 40 carried by and secured to the end of the shaft 22. A driving pulley 41 is carried by the enlarged portion 39 of the sleeve 37 and is secured thereto by means of the screws 41'. The pulley 41 is adapted to be operatively connected to the machine to be driven by a V-belt or any other suitable driving means. From the above it will be observed that the driven element is journalled on the shaft 22 and is free to rotate relative thereto.

A bracket 42 having a hub 43 is secured to the frame 10 by means of screws 44 which are threaded into the frame 10 and pass through holes 45 in the ends of the bracket, the holes 45 being slightly larger than the diameter of the screws 44 in order that the bracket may shift relative to the frame during assembly. The hub 43 of the bracket 42 is formed with a series of internal helical grooves 46 which receive threads or teeth 47 formed on a shouldered sleeve 48 carried by the hub 43. The sleeve 48 receives the outer race 36 of the ball bearing 34, the race 36 being held against the shoulder of the sleeve by a split spring-ring 49 thus preventing endwise movement of the race relative to the sleeve.

An operating lever 50 having a split hub 51 is clamped by the screw 52 to the reduced portion 53 of the sleeve 48. A spring 54 has one of its ends connected to the lever 50, and its other end is connected to an arm 55 adjustably secured by the screws 60 to the bracket 42. The purpose of the spring 54 is to urge the arm 50 in a clockwise direction as viewed in Figure 2.

Adjustably mounted on the bracket 42 is a screw-threaded brake-supporting rod 56 on the inner end of which is swiveled the brake-shoe 57 having adjustable arms 58. These arms engage the lower horizontal portion of the bracket 42 to prevent the brake-shoe 57 from turning relative to the brake-supporting rod 56. By turning the screw-threaded rod 56 the clearance between the brake-shoe 57 and the clutch face of the driven element may be varied. A lock-nut 59 is provided for locking the rod in its adjusted position.

Figure 2:
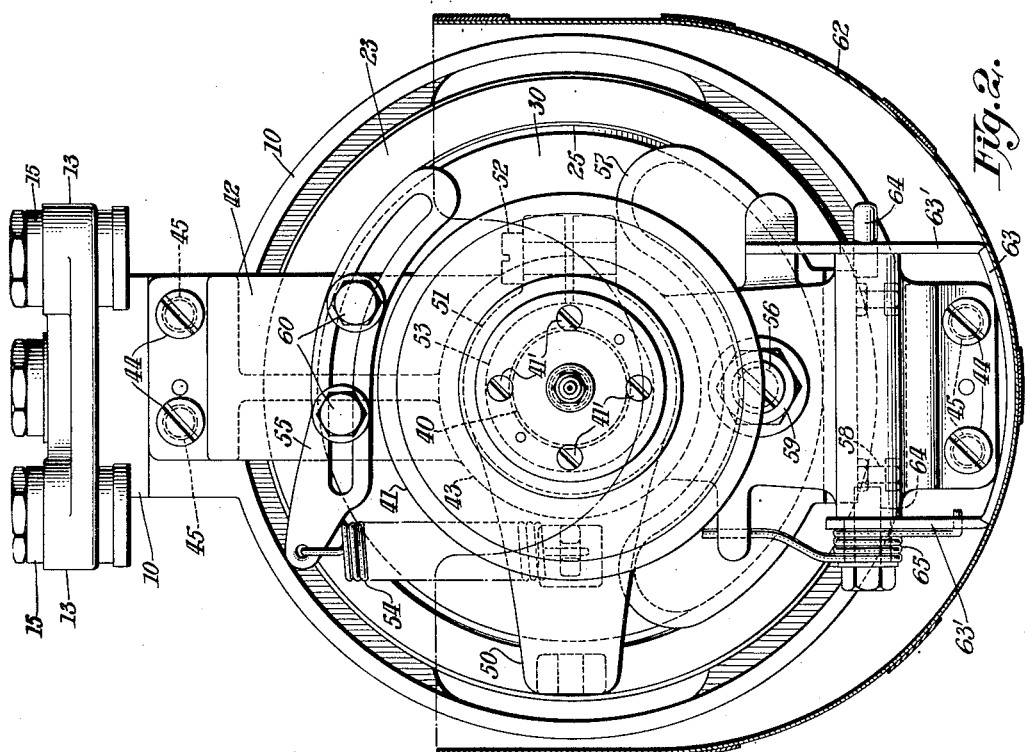
Figure 2 is an end elevation of the transmitter shown in Figure 1.
Figure 3:
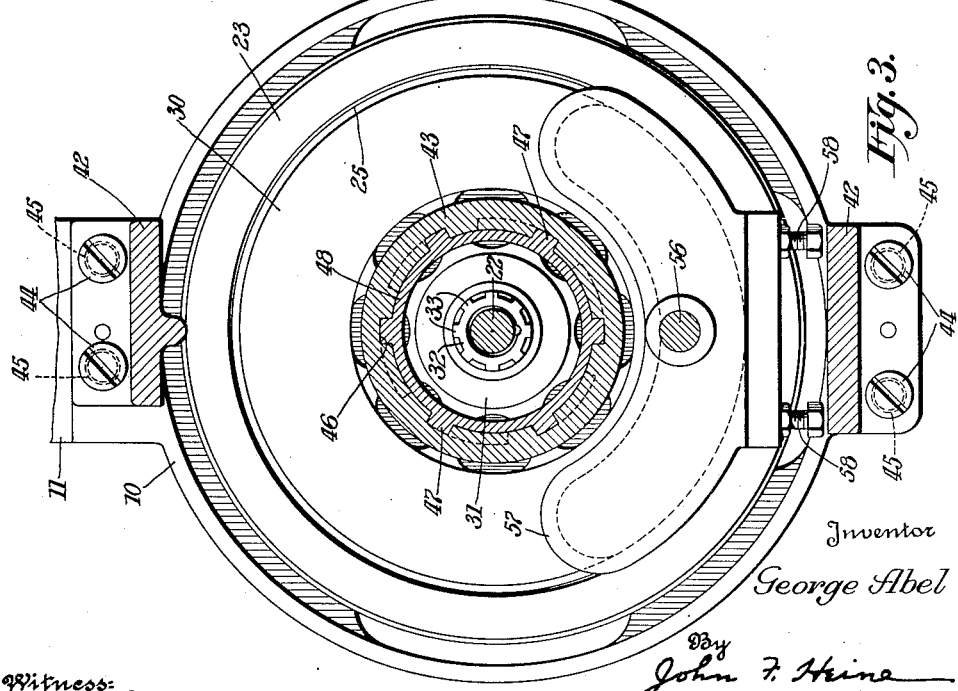
Figure 3 is a sectional view taken substantially along the line 3—3 of Figure 1.

As shown in Figs. 1 and 2 a sheet metal guard 62 is provided in order to protect the operator. The guard 62 is carried by a metal bracket 63 having arms 63' which are pivotally secured at 64 to the bracket 42. A spring 65 is provided to resiliently maintain the guard in the position shown in Figures 2 and 3.

Operation

Assuming that the driving element 23 is rotating about its axis and the parts are in the position shown in Figures 1 and 2, when the operating lever 50 is pulled downwardly against the action of the spring 54, by a treadle or any other suitable means, the sleeve 48 is turned and due to the helical internal grooves 46 in the hub 43 and the threads 47 on the sleeve 48 the sleeve is moved endwise to the right as viewed in Figure 1. This endwise movement of the sleeve 48 is transmitted to the driven element through the deep-grooved ball bearing 34 and, consequently, the disk 30 of the driven element is shifted into contact with the friction disk 26 carried by the driving element and rotates therewith. It will be understood that the inner race of the ball bearings 28 and 40 are fixed to the shaft 22 and that the inner surface of the hub 31, and the inner surface of the enlarged portion 39 of the sleeve 37, slide over the periphery of the outer races of these ball bearings when the driven element is shifted. When the operating lever 50 is released the spring 54 pulls the lever 50 upwardly and this movement of the lever turns the sleeve in a clockwise direction and the helical grooves 46 and threads 47 shift the ball bearing 34 and the driven element to the left as viewed in Fig. 4 and into contact with the brake-shoe 57, thereby stopping the rotation of the driven element.

From the above it will be observed that both the driving and driven element are carried by a common shaft thus insuring that the two clutch elements will rotate about the same axis. Also, that the driven element is supported intermediate its ends by an external bearing that serves the double function of transmitting a longitudinal or endwise shifting motion to the driven element, and also supports the driven element and the extending end of the shaft 22 against bending due to the pull of the driving connection between the pulley 41 and the machine to be driven. It will also be observed that the correct position of the bracket 42 relative to the frame 10, is determined by the shaft 22, as during the assembly of the transmitter the shaft 22 supports the bracket 24 until it is clamped in position by the screws 44 which extend through holes in the bracket, the holes being of larger diameter than the screw. This construction insures that the axis about which the driving element 23, driven element 30, and the inner race 35 of the ball bearing 34 rotate will coincide and be common to all three elements. The axis of the clutch elements are, therefore, maintained in permanent alignment and are adequately supporting so that they may absorb the strain that is placed upon them due to the quick acceleration and deceleration of the machine.

Having thus set forth the nature of the invention, what I claim herein is:

1. An electric transmitter comprising a hollow cylindrical frame having a tubular portion projecting into said frame from one end thereof, a stationary motor member mounted on said tubular portion, a shaft supported by said tubular portion, a rotary motor member carried by said shaft and having a driving clutch face, a driven clutch element also carried by said shaft, a bearing supported by said frame and externally embracing a portion of said driven element, and manual means for shifting said bearing to cause the driven element to move relative to the shaft and engage the driving clutch face of the motor member.

2. An electric power transmitter comprising a frame having a centrally located tubular portion, an electric motor stator carried by said tubular portion, a shaft extending into and journalled in said tubular portion, an electric motor rotor carried by said shaft and cooperating with the stator, said rotor having a driving clutch face, a driven clutch element journalled on said shaft and having a tubular portion, a bearing engaging the outer surface of said tubular portion, a bracket adjustably secured to said frame for supporting said bearing, and means for shifting said bearing relative to its support.

3. An electric transmitter comprising a frame, an electric motor housed in said frame and having a rotor carried by a shaft, said rotor having a driving clutch face, a driven clutch element journalled on said shaft and slidable relative thereto into and out of engagement with the clutch face on the rotor, a bracket secured to said frame, a bearing carried by said bracket and embracing and supporting said driven element, and manual means for shifting said bearing endwise to cause it to engage and disengage said rotor.

4. An electric transmitter comprising an electric motor having a rotor carried by a shaft, a driven clutch element carried by said shaft and slidable lengthwise thereof into and out of engagement with the rotor, a bearing embracing and supporting said driven element, a sleeve in which said bearing is secured, a bracket supporting said sleeve, and interengaging elements between said bracket and sleeve for shifting said bearing sidewise when said sleeve is turned.

5. An electric transmitter comprising an electric motor having a rotor carried by a shaft, said rotor having a driving clutch face, a driven element journalled on said shaft for endwise movement thereon, a ball-bearing having its inner race embracing and secured to said driven element and its outer race secured to a sleeve, a support for said sleeve, and means carried by said support for shifting said sleeve endwise to cause the ball bearing and driven element to move endwise into engagement with the driving clutch face of the rotor.

6. An electric transmitter comprising a frame, an electric motor housed in said frame and having a rotor carried by a shaft, said rotor having a driving clutch face, a driven clutch element journalled on said shaft and slidable relative thereto into and out of engagement with the clutch face on the rotor, a bracket secured to said frame, a bearing carried by said bracket and embracing and supporting said driven element, and means interposed between said bearing and said bracket for causing said bearing to move relative to said bracket and shift the driven element into and out of engagement with the driving clutch face on the rotor.

7. An electric transmitter comprising a hollow cylindrical frame having a centrally located tubular portion therein, an electric motor stator fixed to the outer periphery of said tubular portion, a shaft journalled in said portion, an electric motor rotor carried by said shaft and cooperating with said stator, said rotor having a clutch driving face, a driven element having a tubular portion and journalled on said shaft and slidably longitudinally thereof into and out of engagement with the driving face on the rotor, a ball-bearing having its inner race secured to the tubular portion of the driven element, a member carried by the frame for supporting the bearing, and means for shifting said bearing sidewise to cause it to move the driven element into and out of engagement with the driving face of the rotor.

8. An electric transmitter comprising a hollow cylindrical frame having a centrally located tubular portion therein, an electric motor stator fixed to the outer periphery of said tubular portion, a shaft journalled in said portion, an electric motor rotor carried by said shaft and cooperating with said stator, said rotor having a clutch driving face, a driven element having a tubular portion and journalled on said shaft and slidable longitudinally thereof into and out of engagement with the driving face on the rotor, a ball bearing having its inner race secured to the tubular portion of the driven element, a sleeve to which the outer race of the ball bearing is secured, a bracket carried by the frame for supporting said sleeve, a lever for turning said sleeve, and cam means interposed between said bracket and said sleeve for moving said sleeve endwise when it is turned by the lever.

GEORGE ABEL.